(No Model.)  3 Sheets—Sheet 1.
J. W. VAN DYKE.
WATER TUBE BOILER.
No. 315,189.  Patented Apr. 7, 1885.
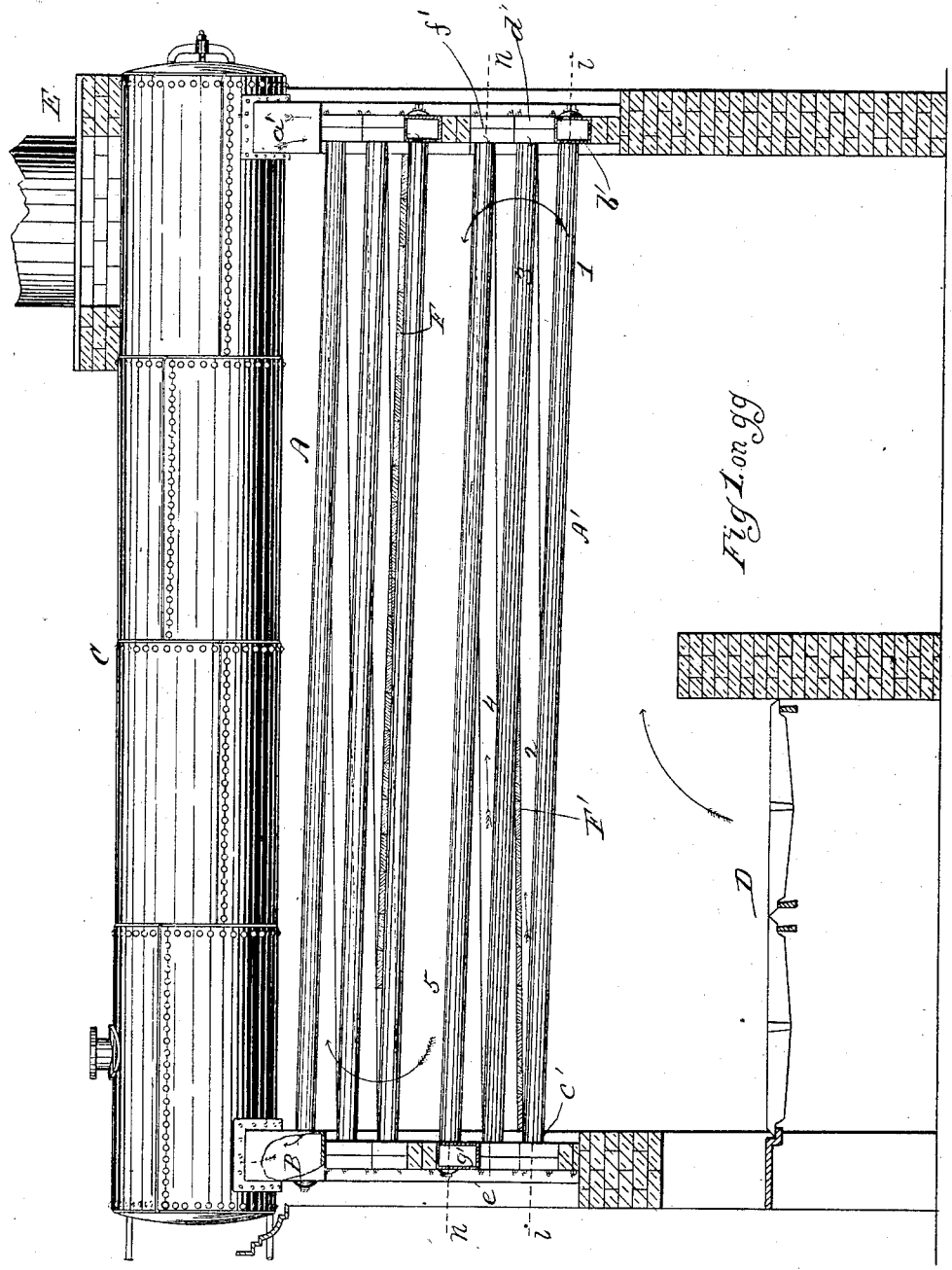
Witnesses
John Gregg
Wm A. Pollock
Inventor:
John W. Van Dyke
By his Attorney
E N Dickerson Jr

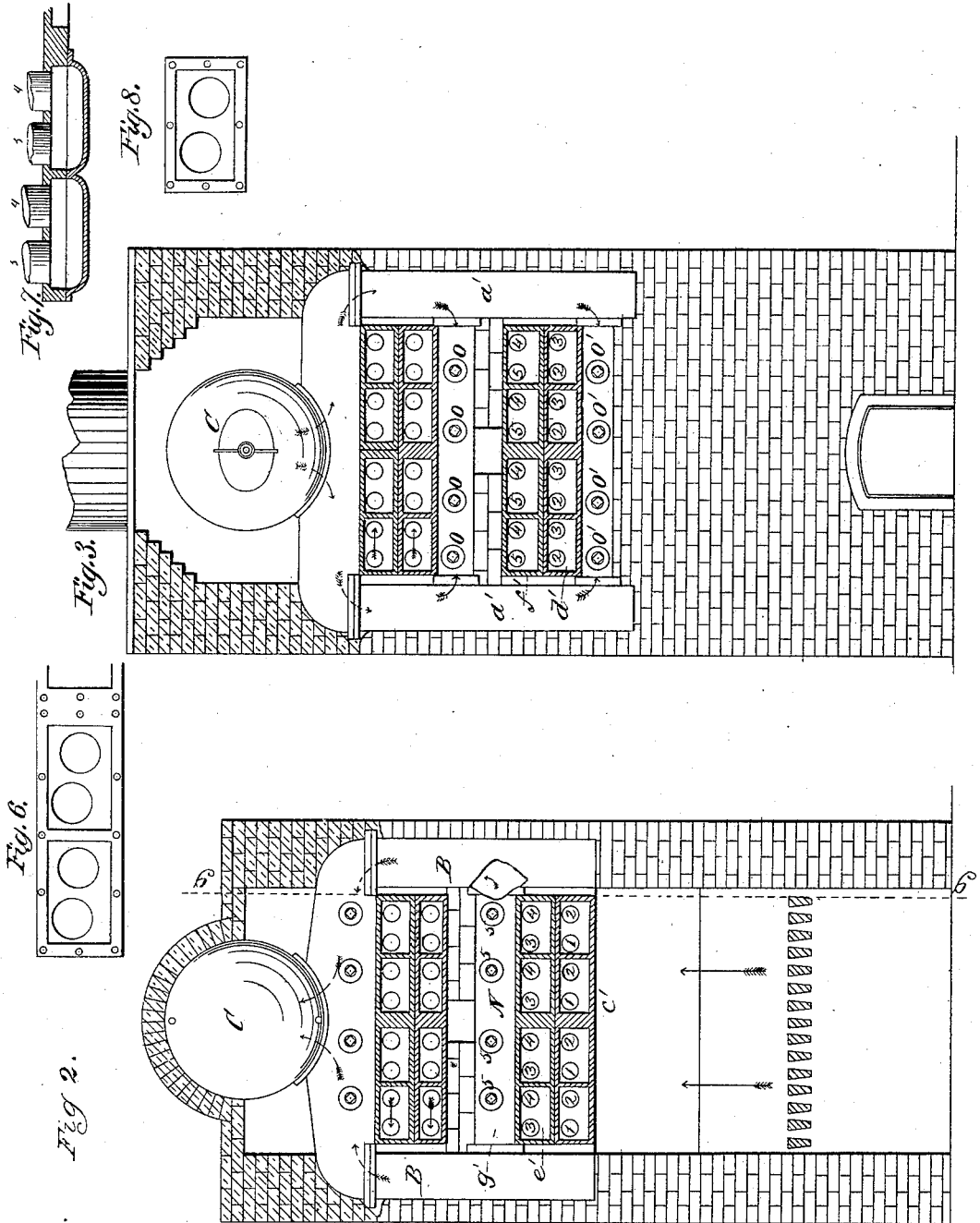

(No Model.)
J. W. VAN DYKE.
WATER TUBE BOILER.
No. 315,189. Patented Apr. 7, 1885.
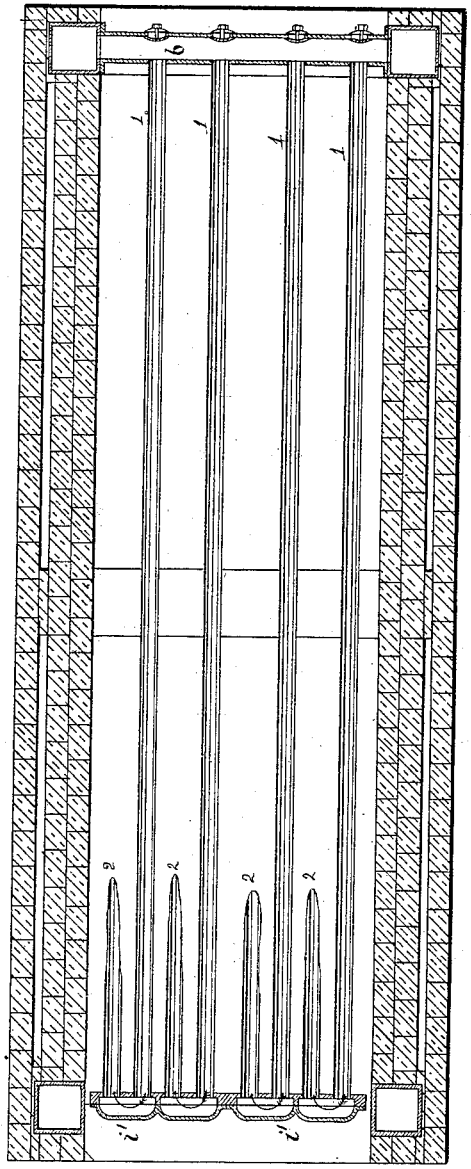
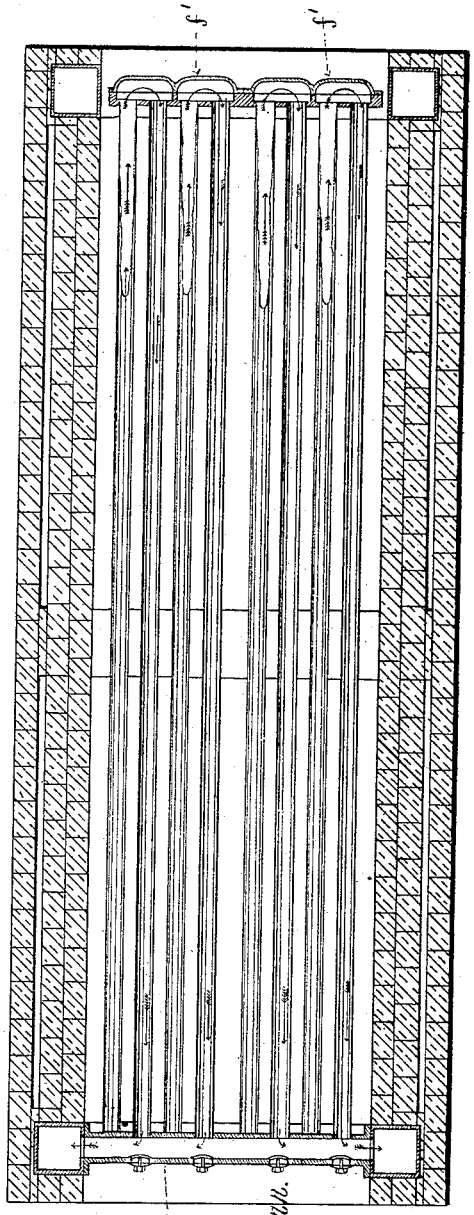
Witnesses
John Gregg
Wm. A. Pollock
Inventor:
John W. Van Dyke
By his Attorney
E. N. Dickerson Jr.

UNITED STATES PATENT OFFICE.

JOHN W. VAN DYKE, OF BROOKLYN, NEW YORK.

WATER-TUBE BOILER.

SPECIFICATION forming part of Letters Patent No. 315,189, dated April 7, 1885.

Application filed July 16, 1884. (No model.)

*To all whom it may concern:*

Be it known that I, JOHN W. VAN DYKE, of the city of Brooklyn, county of Kings, and State of New York, have invented a new and useful Improvement in Water-Tube Boilers or Water-Heaters, of which the following is a full, true, and exact description, reference being had to the accompanying drawings.

In this application when I use the word "pipe" I refer either to what are known as "pipes" or "tubes" in the trade. By this invention I arrange my pipes in headers, which consist of a series of chambers, each containing two pipes arranged on the same or nearly the same horizontal plane. In the previous structures of this class the pipes have been arranged in headers over each other, so that the circulation of the water has been from a pipe beneath, through a chamber, and into a pipe above. By this arrangement the circulation of water is from one pipe through a chamber to another pipe immediately adjacent thereto. That which is new in my invention will be found pointed out in the claims hereto annexed.

In my drawings similar letters refer to similar parts.

Figure 1 represents a general vertical elevation of my boiler. Fig. 2 represents an end view, partly in section, with the covers of my circulating-headers removed. Fig. 3 represents a back view of the same. Fig. 4 represents a horizontal section through Fig. 1 on the line $i\ i$, and Fig. 5 represents a section through Fig. 1 on the line $n\ n$. Figs. 6 and 8 represent a view of a modification of my header. Fig. 7 represents a view of the header shown in Fig. 3, with the tubes in position. Fig. 1 is taken partly in section on the line $g$ $g$ of Fig. 2.

In the drawings, A represents the pipes connecting the headers at either end of the boiler. In the form shown these pipes A are arranged in two series, the lower one being marked A'. The water enters the series A' through the stand-pipes $a'$, (shown in Fig. 3;) thence the water passes into the horizontal open header $b'$; thence it passes into the series of tubes marked 1 in the drawings. The pipes 1 enter the horizontal header $c'$, (shown in Fig. 2,) which header consists of a series of circulating-chambers arranged horizontally, each chamber containing two pipes which are at or about the same horizontal level. The water entering by the pipes 1 passes into the pipes 2; thence through chambers in the horizontal header $d'$ to pipes 3; thence through chambers in the horizontal header $e'$ to pipes 4; thence through chambers in the horizontal header $f'$ to pipes 5. The other end of the pipes 5 enters the continuous open header $g'$. The open header $g'$ communicates with the stand-pipes B, which communicate with the drum C, which constitutes the steam-space of the boiler. The stand-pipes $a'$ and B both connect with the bottom of the drum C at the different ends thereof. The grate-bars are shown at D, and the products of combustion are compelled to travel through a circuitous path to the chimney E by means of deflectors F F', which may be preferably made of fireproof material laid transversely upon the rows of pipes, leaving openings at either end, as shown. If desired, the headers may be arranged with the pipes one a little above the other to increase the circulation; but this is not essential. This arrangement is shown in Figs. 6 and 8. As many of these series of independent circulating-sections may be employed as is desired. As shown, two are used. Any number of circulating-pipes may be employed in each series, or but one series may be employed in certain instances.

The advantage in breaking the pipes up into series is, that a more rapid circulation is obtained by delivering from and into large open stand-pipes through a short series than would be obtained by forcing the water or steam through the entire series of pipes.

It will be obvious that the arrangement of these pipes can be somewhat varied without departing from the spirit of my invention, the novelty of which consists in the peculiar horizontal circulation herein shown. It will be seen that by this arrangement a very compact structure can be made, the tubes lying close together in horizontal planes instead of being separated vertically. The deflectors F F' are not essential.

What I claim as my invention, and desire to secure by Letters Patent, is—

1. The combination, with two or more horizontal headers arranged at either end of a boiler or steam-generator, each of said horizontal headers having chambers, each chamber containing two openings at or nearly at the same horizontal plane, of pipes connecting each header with a header at the other end of the boiler, arranged at a higher level than the first header, and with the connections shown, whereby the water is caused to circulate horizontally, or nearly so, through each header-chamber, and then through a pipe to the opposite header at a higher level than the first header, and thence horizontally through the second header-chamber, and through a pipe returning again through the heating-space, substantially as described.

2. The combination, with two or more horizontal headers arranged at either end of a boiler or steam-generator, each of said headers being divided by vertical partitions into chambers, each chamber containing two openings at or nearly at the same horizontal plane, of pipes connecting each header with headers at the other end of the boiler, arranged at higher and lower levels than the first header, and with the connections shown, whereby the water is caused to circulate horizontally, or nearly so, through each header-chamber, and then through a pipe to the opposite header at a higher level than the first header, and thence horizontally through the second header-chamber, and through a pipe returning again through the heating-space, substantially as described.

JOHN W. VAN DYKE.

Witnesses:
CHARLES HENSCHEL, Jr.,
JOHN G. NEUBAUER.